United States Patent [19]

Smoot et al.

[11] 4,436,449

[45] Mar. 13, 1984

[54] DRILL SHIP PIPE CAPTURE

[75] Inventors: Arren F. Smoot; Sijtze De Jong, both of San Jose, Calif.

[73] Assignee: Shell Oil Company, Houston, Tex.

[21] Appl. No.: 452,245

[22] Filed: Dec. 22, 1982

[51] Int. Cl.³ .................... F16L 1/00; B23P 19/04; B63C 11/00

[52] U.S. Cl. .................... 405/170; 166/343; 405/158; 405/169

[58] Field of Search .................... 405/168–171, 405/158, 188–193; 166/340–343; 29/237; 285/18, 24, 27

[56] References Cited

U.S. PATENT DOCUMENTS

| | | | |
|---|---|---|---|
| 3,785,160 | 1/1974 | Banjavich et al. | 405/170 |
| 3,834,169 | 9/1974 | Abbott | 405/170 |
| 3,835,655 | 9/1974 | Oliver | 405/170 |
| 4,068,492 | 1/1978 | Reneau | 405/170 |
| 4,076,130 | 2/1978 | Sumner | 405/170 |
| 4,133,182 | 1/1979 | Chateau | 405/169 |
| 4,188,050 | 2/1980 | Lochte | 166/341 X |
| 4,218,158 | 8/1980 | Tesson | 405/158 |
| 4,229,120 | 10/1980 | Wallace et al. | 405/193 X |
| 4,253,779 | 3/1981 | Grognu | 405/188 X |
| 4,302,652 | 11/1981 | Nobileau et al. | 405/189 X |

Primary Examiner—Dennis L. Taylor

[57] ABSTRACT

A method and apparatus are provided for positioning, aligning and interfacing a towed pipe string to a previously installed pipe segment by positioning an end of the pipe string within a predetermined range of an end of the pipe segment, attaching a first gripper block to the end of the pipe string, moving an alignment tool over to the pipe segment while paying out connecting means between the alignment tool and the first gripper block, attaching a second gripper block of the alignment tool to the end of the pipe segment, tensioning the connecting means to draw the end of the pipe segment and the end of the pipe string within close proximity of each other, attaching a third gripper block of the alignment tool to the end of the pipe string, the second gripper block and the third gripper block being in a spaced-apart position, and drawing the second gripper block and the third gripper block toward each other, thereby aligning the end of the pipe string with the end of the pipe segment.

12 Claims, 2 Drawing Figures

STEP 1

STEP 2

STEP 3

STEP 4

STEP 5

STEP 6

DRILL SHIP PIPE CAPTURE

BACKGROUND OF THE INVENTION

The problems of positioning, aligning and interfacing a towed pipe string offshore to a previously installed pipe segment are substantial. Strings of relatively stiff, large diameter pipe, several miles in length, are assembled and tested at a suitable shore facility and then towed for end-to-end alignment and connection in water depths up to 2000 feet. On-bottom connection of such pipe is both expensive and time consuming and requires that the candidate connection system be both technically and economically sound. While there is no single solution for all deepwater subsea connection situations, a connection system has been developed that appears to solve many of the needs of the art.

REFERENCE TO RELATED APPLICATION

Application Ser. No. 394,034 filed June 30, 1982, is of relevance to the present application.

SUMMARY OF THE INVENTION

The present invention pertains to a method and apparatus for positioning, aligning and/or interfacing a towed pipe string to a previously installed pipe segment in an offshore environment.

More specifically, the present invention provides a method and apparatus for aligning a pipe string with a previously installed pipe segment by positioning an end of the pipe string within a predetermined range of an end of the pipe segment, attaching a first gripper block to the end of the pipe string, moving an alignment tool over to the pipe segment while paying out connecting means between the alignment tool and the first gripper block, attaching a second gripper block of the alignment tool to the end of the pipe segment, tensioning the connecting means to draw the end of the pipe segment and the end of the pipe string within close proximity of each other, attaching a third gripper block of the alignment tool to the end of the pipe string, the second gripper block and the third gripper block being in a spaced-apart position, and drawing the second gripper block and the third gripper block toward each other, thereby aligning the end of the pipe string with the end of the pipe segment. Preferably, the first gripper block is a detachable part of the alignment tool; the second gripper block is a fixed-position part of the alignment tool and the third gripper block is a sliding part of the alignment tool. More preferably, the connecting means is two tugger cables and the alignment tool is positioned by means of a drill string from a vessel.

Other purposes, advantages and features of the invention will be apparent to one skilled in the art upon review of the following.

DESCRIPTION OF THE PREFERRED EMBODIMENT

The present invention provides a system for completing the connection of a section of pipeline after it has been delivered to an on-bottom site, using a special connecting tool. Preferably, the delivered pipe is located with its end within about 500 feet of the end of a pipeline already laid. The operation is controlled from a surface vessel (not shown) with pipe handling equipment and a moonpool (if a drill ship is employed) large enough to enclose the connecting tool during transit. During the connecting operation the connecting tool is suspended from a drill string which also serves to deliver the working fluid—preferably sea water—for the various hydraulic systems.

Figure 1:
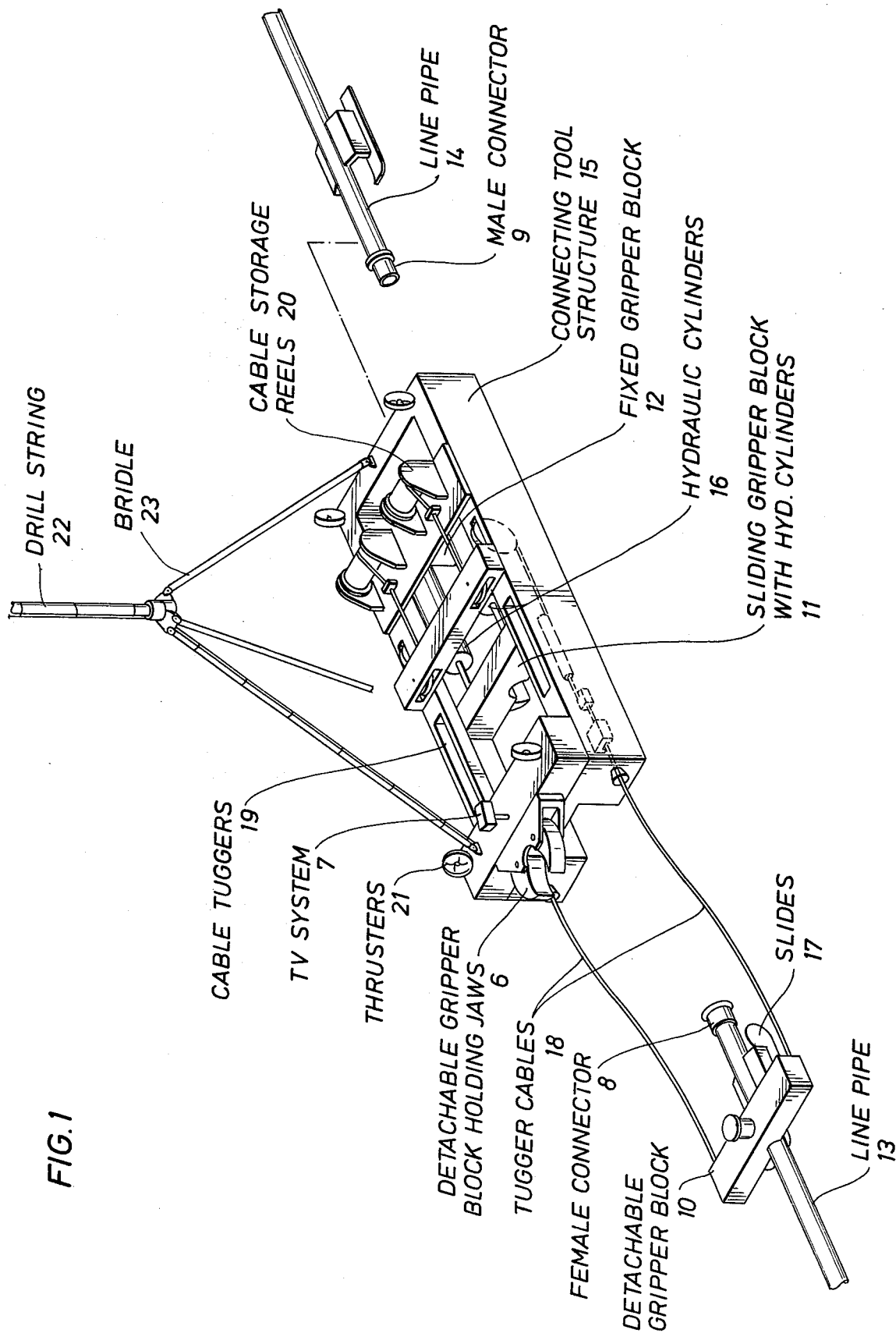
FIG. 1 provides a view of a pipe capture and connecting vehicle.

The basic configuration of the connecting tool is shown in FIG. 1. The tool is, for example, about 35 feet long and 11 feet wide, enabling it just to fit into the moonpool of a typical drill ship. In principle, the connecting tool includes three gripper blocks 10, 11 and 12 which engage the pipes 13 and 14 having male-female connectors 8 and 9 and are supported by a frame 15 which also carries other items of equipment necessary for the operation, e.g. television system 7. Two of the gripper blocks 11 and 12 are located permanently on the frame 15, one fixed rigidly and the other mounted on slides and activated by hydraulic cylinders 16. The third gripper block 10 is attached to the end of the frame 15 and is releasable by means of gripper block holding jaws 6. Block 10 is connected to the main unit 15 by two steel cables 18, each for example about 1000 feet long, which are controlled by a pair of tugger type linear winches 19 and stored on drums 20 mounted on top of the frame 15. Also on the frame 15 are four hydraulically operated thrusters 21, one at each corner for orientational control in the horizontal plane. The entire assembly is suspended from the drill string 22 or other suspension means 23, preferably three-legged.

Figure 2:
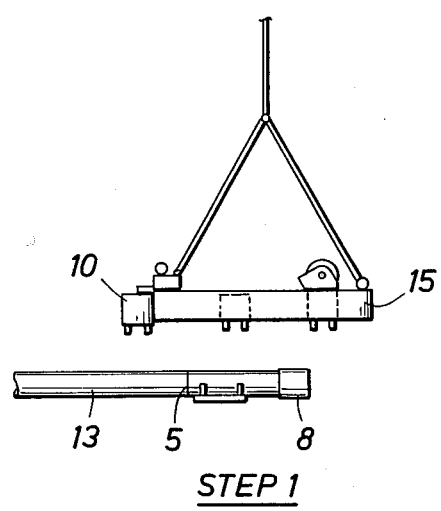
FIG. 2 shows the steps in conducting the procedure of the invention.
Figure 2:
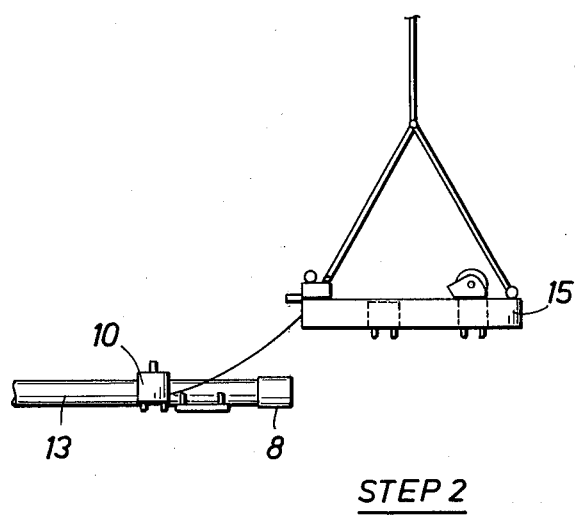
Figure 2:
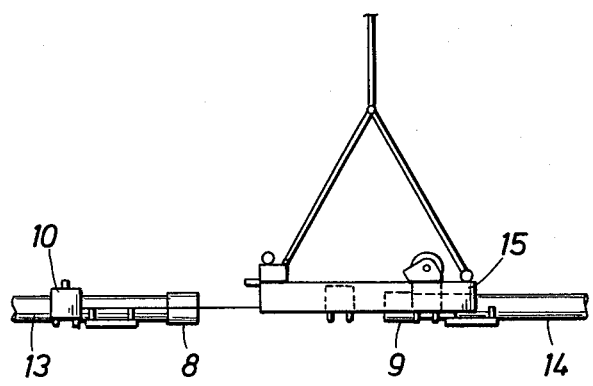
Figure 2:
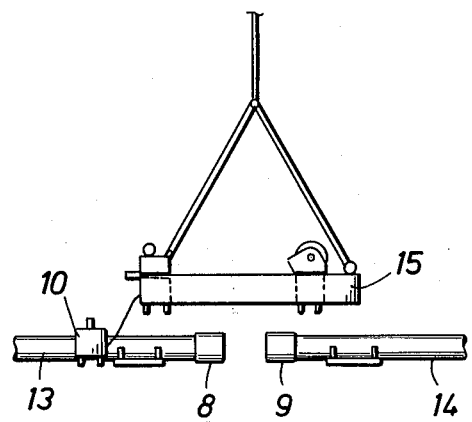
Figure 2:
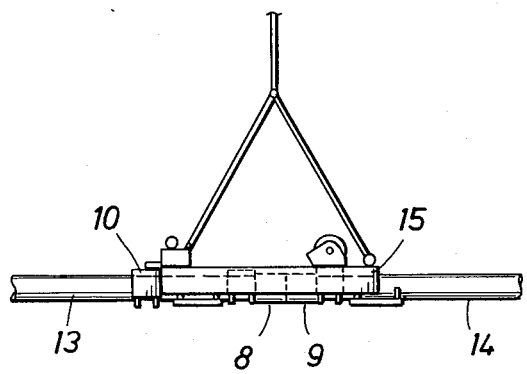
Figure 2:
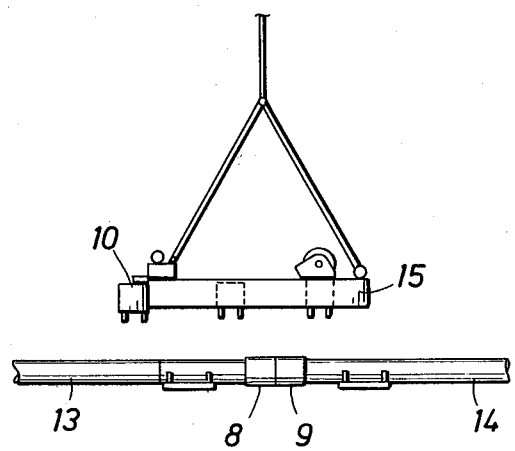

The connecting operation is presented pictorially in FIG. 2. Step 1, with the end of the delivered pipe 13 located, the unit 15 is lowered on to it, for example with the aid of acoustics. Maneuvering control is achieved by the use of the thrusters 21 located on the frame 15. Step 2, initial engagement is made with the releasable gripper block 10 which locks onto the end of the pipe 13, just behind a special collar 5 provided for that purpose. Once secured on the end of the pipe the unit is released from the main tool assembly 15 which then backs off. The two cables 18 running to the gripper block 10 are paid out as the main assembly 15 is moved over to the end of the pipeline 14 which is already laid. Step 3, on reaching the end of the laid pipe 14 the frame 15 is lowered onto it and locked into position with the fixed gripper block engaging just behind the coupling 9. The cables are then tensioned by means of the tuggers 19 and in this way the two pipe ends 13 and 14 are drawn towards each other. Step 4, when the two ends 13 and 14 are within about 6–10 feet, preferably about 8 feet of each other, the connecting tool 15 is released from the laid pipe 14 and raised up with the sliding gripper block 11 extended. Step 5, the unit is then lowered so that the sliding and fixed gripper blocks 11 and 12 engage the ends of the new and the previously laid pipes 13 and 14 respectively, just behind the coupling halves 8 and 9. In step 6, the connection is completed as the sliding gripper block is retracted bringing the two halves 8 and 9 of the coupling into engagement and also returning the releasable component 10, still attached to the new pipe back to its original position on the frame of the connecting tool 15. With the connection complete and releasable gripper component 10 reinstalled on the main unit 15, the three gripper blocks 10, 11 and 12 are disengaged and the connecting unit 15 is returned to the surface.

The foregoing description of the invention is merely intended to be explanatory thereof. Various changes in the details of the described method and apparatus may be made within the scope of the appended claims without departing from the spirit of the invention.

What is claimed is:

1. A method for aligning a pipe string with a previously installed pipe segment comprising:
   positioning an end of the pipe string within a predetermined range of an end of the pipe segment;
   attaching a first gripper block to the end of the pipe string;
   moving an alignment tool over to the pipe segment while paying out connecting means between the alignment tool and the first gripper block;
   attaching a second gripper block of the alignment tool to the end of the pipe segment;
   tensioning the connecting means to draw the end of the pipe segment and the end of the pipe string within close proximity of each other;
   attaching a third gripper block of the alignment tool to the end of the pipe string, the second gripper block and the third gripper block being in a spaced-apart position; and
   drawing the second gripper block and the third gripper block toward each other, thereby aligning the end of the pipe string with the end of the pipe segment.

2. The method of claim 1 wherein the first gripper block is a detachable part of the alignment tool.

3. The method of claim 1 wherein the second gripper block is a fixed-position part of the alignment tool and the third gripper block is a sliding part of the alignment tool.

4. The method of claim 1 wherein the connecting means is two tugger cables.

5. The method of claim 1 wherein the alignment tool is positioned by means of a drill string from a vessel.

6. The method of claim 1 wherein the pipe ends are connected.

7. An apparatus for aligning a pipe string with a previously installed pipe segment comprising:
   means for positioning an end of the pipe string within a predetermined range of an end of the pipe segment;
   means for attaching a first gripper block to the end of the pipe string;
   means for moving an alignment tool over to the pipe segment while paying out connecting means between the alignment tool and the first gripper block;
   means for attaching a second gripper block of the alignment tool to the end of the pipe segment;
   means for tensioning the connecting means to draw the end of the pipe segment and the end of the pipe string within close proximity of each other;
   means for attaching a third gripper block of the alignment tool to the end of the pipe string, the second gripper block and the third gripper block being in a spaced-apart position; and
   means for drawing the second gripper block and the third gripper block toward each other, thereby aligning the end of the pipe string with the end of the pipe segment.

8. The apparatus of claim 7 wherein the first gripper block is a detachable part of the alignment tool.

9. The apparatus of claim 7 wherein the second gripper block is a fixed-position part of the alignment tool and the third gripper block is a sliding part of the alignment tool.

10. The apparatus of claim 7 wherein the connecting means is two tugger cables.

11. The apparatus of claim 7 wherein the alignment tool is positioned by means of a drill string from a vessel.

12. The apparatus of claim 7 wherein the pipe ends are connected.

* * * * *